United States Patent [19]
Albaret

[11] Patent Number: 6,149,058
[45] Date of Patent: Nov. 21, 2000

[54] CHIP CARD READER WITH FAST TRANSMISSION PROTOCOL

[75] Inventor: Thierry Albaret, Aix en Provence, France

[73] Assignee: STMicroelectronics S.A., Gentilly, France

[21] Appl. No.: 09/108,164

[22] Filed: Jun. 30, 1998

[30] Foreign Application Priority Data

Jul. 4, 1997 [FR] France .................................. 97 08514

[51] Int. Cl.[7] .......................... G06X 05/00; G06X 19/06
[52] U.S. Cl. ........................ 235/380; 235/491; 235/492; 235/493
[58] Field of Search ................................. 235/380, 491, 235/492, 493; 395/500

[56] References Cited

U.S. PATENT DOCUMENTS

| | | | |
|---|---|---|---|
| 4,803,351 | 2/1989 | Shinenaga | 235/492 |
| 4,916,296 | 4/1990 | Streck | 235/454 |
| 5,146,499 | 9/1992 | Geffrotin | 380/23 |
| 5,590,306 | 12/1996 | Watanabe et al. | 395/442 |
| 5,664,157 | 9/1997 | Takahira et al. | 395/500 |
| 5,809,241 | 9/1998 | Hanel et al. | 395/200 |

FOREIGN PATENT DOCUMENTS

| | | | |
|---|---|---|---|
| 0 680 002 A2 | 4/1995 | European Pat. Off. | G06K 7/08 |
| 0 727 759 A1 | 2/1996 | European Pat. Off. | G06K 19/07 |

*Primary Examiner*—Donald Hajed
*Assistant Examiner*—Douglas X. Rodriguez
*Attorney, Agent, or Firm*—Theodore E. Galanthay; Allen, Dyer, Doppelt, Milbrath & Gilchrist, P.A.

[57] ABSTRACT

A chip card reader may be connected to a microcomputer to provide for data exchanges in the read or write mode between the card and the microcomputer, under the control of the microcomputer. The reader is capable of carrying out data exchanges between the card and the microcomputer and works without a microprocessor. The chip card reader is provided, firstly, with a data buffer memory enabling the temporary storage of the pieces of data read in the card, and, secondly, with a frequency divider programmable by a frequency signal to set the bit time at will. By the division of frequency of an internal clock of the reader, this bit time is the duration corresponding to the transmission of a data bit in the data exchanges between the chip card and the reader. The reader can then carry out transmissions with slow or fast protocols independently of the microcomputer.

31 Claims, 2 Drawing Sheets

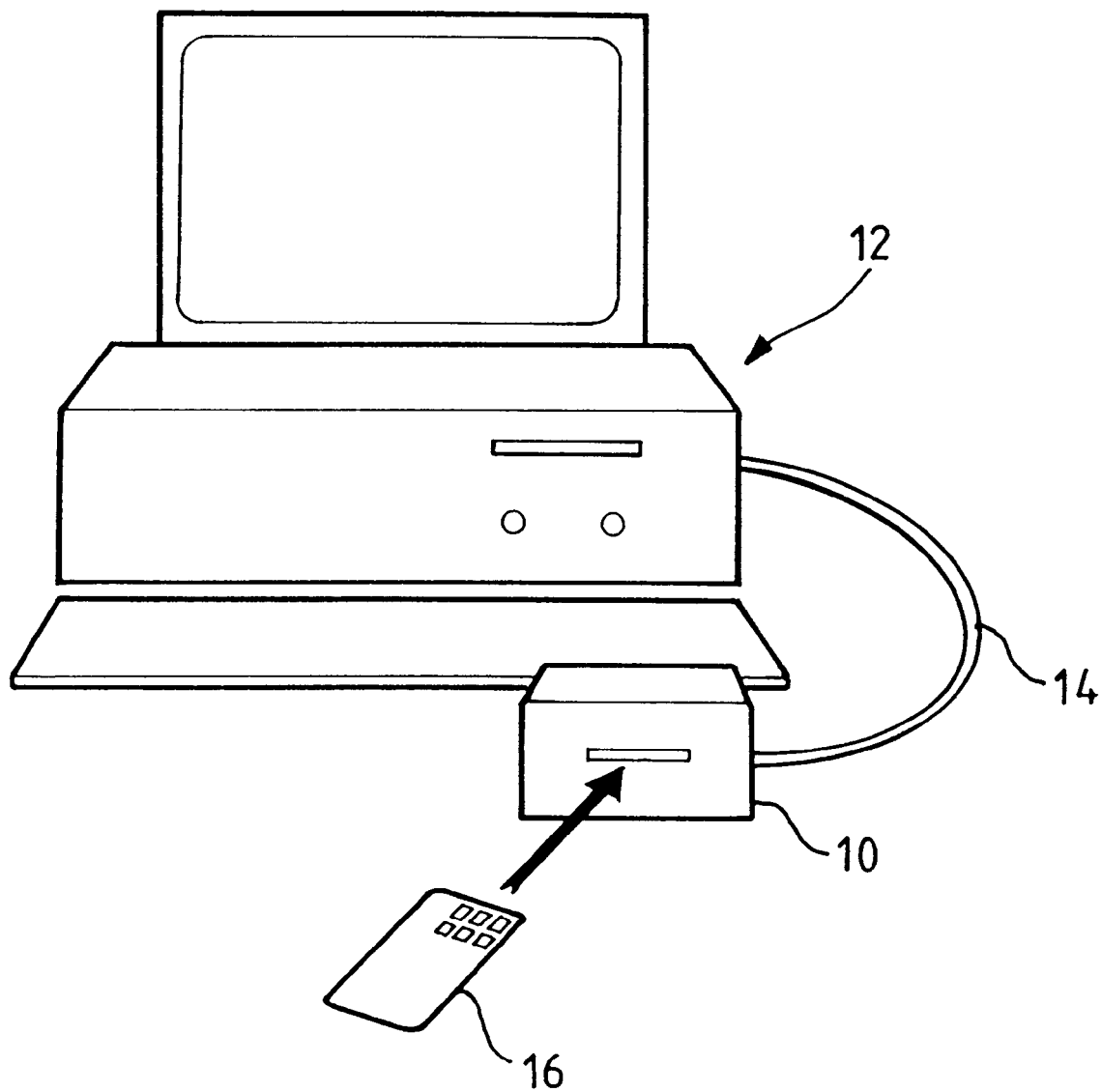
FIG_1

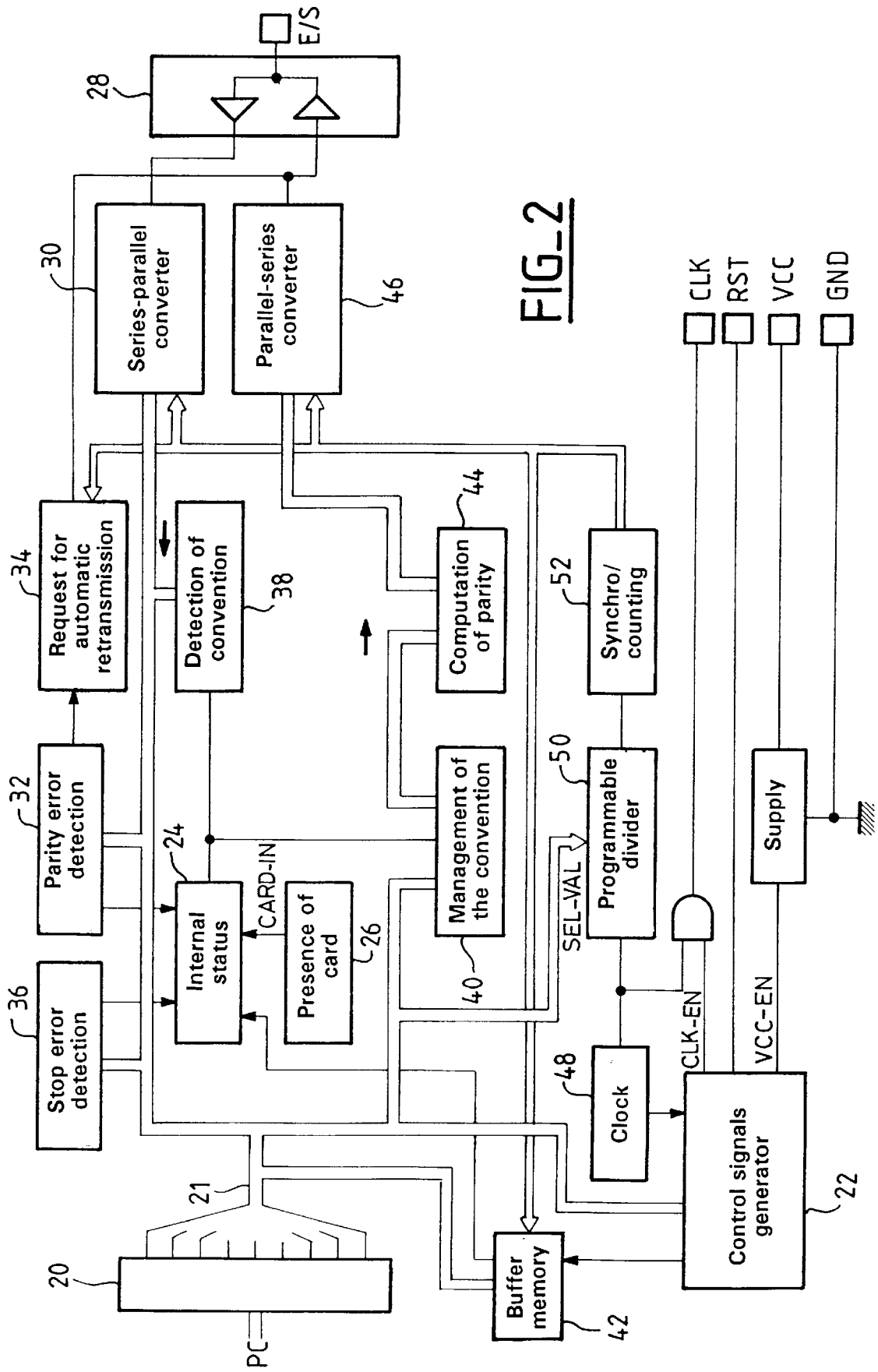
FIG_2

CHIP CARD READER WITH FAST TRANSMISSION PROTOCOL

FIELD OF THE INVENTION

The invention relates to a chip card reader, and more particularly, to a chip card reader to be connected to a microcomputer to carry out an exchange of data in the read or write mode between the card and the microcomputer under the control of the microcomputer.

BACKGROUND OF THE INVENTION

Most chip card readers operate by means of a microprocessor that is powerful enough to enable, firstly, control over communications between the card and the reader and, secondly, communications between the reader and the microcomputer. The difficulty of communications between the card and the microcomputer lies firstly in the absence of synchronization between the operation of the card and the operation of the microcomputer. The difficulty in communications between the card and the microcomputer lies secondly in the fact that, at times when the card is communicating with the card reader, the microcomputer may be in the process of performing tasks other than that of communications with the reader.

The presence of a microprocessor in the reader is, therefore, generally considered to be necessary for the management of the exchanges. However, it is relatively expensive.

SUMMARY OF THE INVENTION

According to the invention there is proposed a chip card reader that can be controlled by a microcomputer and is capable of carrying out exchanges between the card and the microcomputer. The reader operates without a microprocessor, but is provided, firstly, with a buffer memory that carries out the temporary storage of the data read in the card and, secondly, with a frequency divider programmable by a digital signal. The frequency divider is settable, at will, by division of the frequency of an internal clock of the reader, of the bit time, namely the duration corresponding to the transmission of a data bit in the data exchanges between the chip card and the reader. The choice of a value of the bit time is fixed by the microcomputer which sends the frequency divider a command defining the division ratio.

In other words, it is planned that the card reader will be formed by a simplified electronic circuit without a microprocessor. Hence, the card reader will be incapable of working under the control of a program of internal instructions. The card reader will comprise very simple means for setting the data transmission protocol between the chip card and the reader. Accordingly, it is possible to decide on a desired and variable fast transmission protocol between the card and the reader. Additionally, the speed of the protocol does not entail any loss of data in the exchanges between the microcomputer and the card. The setting of the protocol is done by the dispatch of a digital signal by the microcomputer to the reader. This digital signal acts on a programmable frequency divider contained in the reader.

More specifically, the invention therefore proposes a chip card reader working without a microprocessor under the control of a microcomputer, to provide for data exchanges between the card and the microcomputer. The reader comprises, firstly, a data buffer memory enabling the temporary storage of a data element read in the card pending its reading by the microcomputer. The card reader secondly includes a digitally programmable frequency divider capable of receiving a digital control signal from an output bus of the microcomputer. This digital control signal represents a desired division ratio. The frequency divider receives a reference clock signal prepared in the reader and gives a synchronization signal for the data exchanges between the card and the reader. This synchronization signal has a period corresponding to a desired value of the bit time, obtained by division of the frequency of the reference clock according to the division ratio given by the microcomputer.

In practice, the division ratio given by the microcomputer could range from 2 to 372. The value 2 corresponds to a very fast exchange protocol and the value 372 does not correspond to the slowest protocol, defined by the ISO 7816-3 standard, but is the one most used. Preferably, the divider may perform a division at least in the ratios 2, 31 and 372.

It is thus possible to obtain a chip card reader that works at a variable bit rate and is capable of working at very high bit rates. This reader may possibly be connected to the two-way parallel port of a microcomputer. Through this port, it is not only the data exchanged that can be transmitted, but also some control signals and especially control signals of the buffer memory and the digital data element representing the division ratio that will define the value of the bit time.

The microcomputer does not need to be extremely fast to enable the collection of the data elements contained in the chip card. This is so even if it performs other tasks at the same time as the reading operation proper. The working of the reader is independent of the speed of the microcomputer. The buffer memory allows the reader to work independently of the microcomputer. The microcomputer can perform several simultaneous tasks without thereby losing data coming from the card. Furthermore, this buffer memory enables a use of the reader in different operating systems (Windows 95, Windows NT, Windows 3.11, DOS, etc.).

In general, the main value of the presence of the buffer memory associated with the programmable frequency divider is that it enables the reader to accept different communications protocols with the card. In these communications protocols the value of the bit time can vary such as from 2 to 372 clock cycle periods.

Readers without microprocessors have already been proposed in the past, but they have had to work with the slowest possible protocol of the ISO 7816-3 standard. The microcomputer has had to be adapted to this protocol so that the microcomputer can read without losing even one of the pieces of information transmitted by the card to the reader.

BRIEF DESCRIPTION OF THE DRAWINGS

Other features and advantages of the invention shall appear from the following detailed description made with reference to the appended figures, of which:

FIG. 1 shows a simplified diagram of the context of the application envisaged; and FIG. 2 shows an overall diagram of the card reader according to the invention.

DETAILED DESCRIPTION OF THE PREFERRED EMBODIMENTS

According to FIG. 1, the chip card reader is designated by the reference 10. It is connected to a microcomputer 12 by a two-way parallel bus 14. A card 16 can be inserted into the reader 10 for the purpose of a data exchange controlled by the microcomputer. The link between the card 16 and the chip can be done conventionally by the contacts of the card and the reader. The data proper is exchanged by a series link on a contact dedicated to this exchange (I/O). The other connection contacts between the reader and the card correspond to a supply (VCC), a ground (GND), a clock (CLK) given by the reader to the card, and other control signals intended for the card. These other control signals may be, for example, for a resetting signal (RST), and a control signal (CTRL) internal to the reader which, for example, enables a definition of whether the exchange is a read exchange or a write exchange in the card. Other signals may be planned, depending on the type of card used and the application (six to eight contacts in all are provided for operating the card).

The architecture of the reader 10 according to the invention is shown in FIG. 2. The communication with the microcomputer is provided through a connector 20 that is connected by a two-way parallel communications bus to the microcomputer on the one hand, and to the internal circuits of the reader on the other hand. This bus 21 conveys the data elements that must be exchanged between the card and the microcomputer, and it also conveys control signals used to obtain the operation of the reader. In particular, as shall be seen, it conveys signals enabling the modification of the communications protocol between the reader and the card, since the reader has no microprocessor that can carry out this modification. Finally, the bus 21 transmits the state signals that control its two-way operation.

The control signals sent out by the microcomputer to the reader are used in the various circuits of the reader. The reference 22 brings together most of the circuits of the reader that use these various control signals and that pilot or control the communication with the card. These circuits, for example, may be for the generation of signals intended for the RST and CTRL contacts on the basis of the commands given by the microcomputer, for the generation of a signal CLK-EN to permit the transmission of a clock signal intended for the card towards the contact CLK, or for the generation of a signal VCC-EN authorizing transmission of a supply voltage to the card, etc.

In the parallel communications bus with the reader, it is also possible to find signals sent by the reader to the microcomputer to provide information to the microcomputer on the internal status of the reader. These signals may be read by the microcomputer in a state register 24 connected to the bus 21. Some of the information from the state register 24 can travel through specific conductors of the bus 21, which are other than the data conductors proper. For example, a conductor may be reserved for the supply of an overall information bit indicating whether an exchange is taking place normally or not. The more detailed information contained in the state register travels through the conductors reserved for the data elements and is given only upon the interrogation of the register 24 by the microcomputer.

The information on the state of the reader may comprise especially as shall be described further below: information on the presence of a card in the reader, information on the presence of data in a buffer memory, and information on transmission errors (parity error or stop error in exchanged data). A card presence detector 26 which in practice is a simple switch activated by the insertion of a chip card into the reader gives a signal CARD-IN to the state register to indicate the presence of the card.

For the exchange of data elements between the microcomputer and the card, the following main operations which shall be described in detail below are performed by the reader: temporary storage of the data in parallel form in a data memory; management of the parity and stop bits; detection and use of the logic convention used by the card; parallel-series conversion for the data written in the chip card and series-parallel conversion for data read in the card. The exchange of data between the card and the reader is done by a two-way serial link, through a single I/O contact of the reader. A two-way buffer amplifier 28 also called a two-wire/one-wire converter provides for the separation between data coming into the reader and outgoing data.

The data read in series in the card goes from the I/O contact to the buffer amplifier 28 and is routed to the incoming data channel of the reader. It is converted into parallel data in a series-parallel converter 30 placed downstream from the amplifier 28 on the incoming channel. As shall be seen, the series-parallel converter samples the data elements read with a sampling period called a "bit time". The bit time must obviously correspond to the period of transmission of series data by the card. This time is a multiple of the period of an internal reference clock of the reader, and transmitted to the card by the contact CLK.

The series-parallel converter 30 then provides the successive data elements given by the card in parallel on the bus 21. If a data element given by the card has N bits (generally 12); the data is available at the output of the converter 30 at the end of N bit times. Typically, a data element given by the card has eight useful bits preceded by an outgoing bit ("start" bit) and followed by a parity bit and two stop bits. This is specified in detail in the standards for chip card systems (especially ISO 7816-3 standard), and this requires not further discussion herein.

If there are errors in the parity bit or in the stop bits, it means that the transmission has been defective and that the useful data element may be erroneous. In the case of a parity error, it is then necessary to provide for a re-transmission of the data by the card and it is the reader that directly, without intervention by the microcomputer, manages this error detection and the re-transmission that must follow. In the case of stop errors, there is no re-transmission request sent to the card, instead the error information is communicated to the microcomputer by means of the state register 24.

A circuit 32 for the detection of the parity errors has been shown in FIG. 2 in the form of a block connected to the parallel bus 21 which transmits the useful data of the card. However, it will be understood that the circuit for the detection of the parity errors could also work directly on the series data elements coming from the amplifier 28, i.e. the circuit 32 would be connected upstream from the series-parallel converter 30. This detection circuit 32 computes the parity bit corresponding to the eight bits of the useful data element received. It compares the result of the computation with the tenth bit of the data element received from the card since this tenth bit is the parity bit computed and sent by the card. The circuit 32 sends an error signal if there is no identity between these two bits, and it controls the transmission by a circuit 34 of a data re-transmission request. The standards set forth that the card may receive a command of this kind and that it re-transmits the same data element as above, i.e. it does not increment the memory address from which it had extracted the previous data element. The parity error is furthermore reported to the state register 24.

It will be noted that the circuit 34 which activates the re-transmission command is an internal circuit of the reader. The re-transmission operation is not managed by the microcomputer, although the reader does not have any microprocessor to manage this situation. The circuit 34 is, therefore, a register to automatically send a series data element interpreted by the card as a re-transmission request.

A stop error detection circuit 36 ascertains that the eleventh and twelfth bits of the data transmitted are equal to the expected values (for example, two stop bits equal to 1). If this is not the case, the circuit 36 sends an error information element towards the state register 24, this error information element being intended for the microcomputer.

A circuit 38 for the detection of the logic convention used by the card is used to find out the meaning of the high and low potential states used by the card to encode the data elements that it sends. The logic convention, therefore, specifies whether the high potential state represents a logic 1 or a logic 0. The convention is proper to the data elements stored in the card, and it is necessary that the reader should be capable of knowing this convention to interpret the data elements received from the card.

The convention is indicated by the card itself when it is put into operation in the reader, and this happens as follows: the reader sends the card a request for an answer to a resetting signal to which the card must respond to give information on the protocol that it uses. The card sends its answer, containing the convention, and the reader detects this convention. More specifically, the resetting signal, sent by the circuits 22 and 24 of the reader upon a command by the microcomputer, may include the dispatch of the supply voltage between the contacts VCC and GND, then the sending of the clock signal CLK and then a change in state of the contact RST which was at the high level by default.

This is the resetting command, and the working protocol of any chip card according to the ISO 7816 standard forces the card to respond by sending a piece of data that is the "answer to reset". The data sent back by the card has eight useful information bits on the nature of the card and on its communications protocol with the reader. Of these eight bits, the fourth defines the forward or reverse convention used by the card. The circuit 38 observes this fourth bit to let through the useful data as such to the microcomputer or to reverse it.

As in the case of the parity error detection circuit and the stop error detection circuit, the convention detection circuit 38 has been shown as being connected to the parallel bus 21, but it could be connected upstream of the series/parallel converter 30. If this is the case, it must be controlled by the synchronization and bit time counting circuits so that it can directly identify the value of the fourth useful data bit in the answer to reset. It then directly controls the series/parallel converter so that it subsequently gives inverted data in the case of a reverse convention. Should the circuits 32 and 36 be placed upstream from the series/parallel converter, this converter gives only the eight useful bits of the data elements of the card on the bus 21 and not the twelve bits transmitted by the card.

It will be noted that while the answer to reset shows that it is necessary to use a reverse convention, it is of course necessary that the processes of writing in the card should also take into account this convention. A circuit 40 for the management of the card write convention carries out this conversion as a function of the indication given by the circuit 38 or by the state register 24 if the latter contains the detected convention.

The pieces of data sent by the card, placed in parallel and verified by the detection circuits 32 and 36, are immediately transferred into a buffer memory 42. The rate of transfer is the rate dictated by the protocol of transmission between the reader and the card. It does not depend on the ability of the microcomputer to carry out the real-time sampling of the information received from the card. The exchange between the reader and the card can be done at very high speed, and the data can be then read more slowly by the microcomputer in the buffer memory, while it is performing another task.

When data has to be transferred between the memory and the card, the working of the memory 42 is controlled by a sequencer at the rate of the bit time synchronization signals which shall be referred to further below. In FIG. 2, this sequencer is considered to form part of the memory 42. However, the transfer of data between the memory and the microcomputer is controlled by the microcomputer itself, at the rate of the microcomputer. There is, therefore, an asynchronism between the two exchanges both in the reading and in the writing of data. The pieces of data that the microcomputer can write in the card travel via the same bus 21 as the those read in the card and are stored in the buffer memory 42.

The pieces of data sent from the buffer memory to the card go through the convention management circuit 40 as was explained further above. They then go into a parity management circuit 44 which computes the value of the parity as a function of the individual values of the eight useful data bits. The parity management circuit 44 assigns this parity value to the rank 10 bit. It is recalled that the data comprehensively transmitted to the card comprises the following in the order given: one start bit, eight useful bits, one parity bit and two stop bits. The stop and start bits may be introduced at any point in transmission, including after the parallel-series conversion. They may be given by the microcomputer.

The data to be transmitted from the buffer memory 42 to the card then goes through a parallel-series converter 46. From there it is sent to the two-way buffer amplifier 28 which applies it to the I/O contact connected to the chip card.

The sequencing of the operation of the reader is carried out, firstly, by a reference clock 48 which is given to the card on the contact CLK and, secondly, as shall be seen, by a bit time synchronization signal whose period is a multiple of the reference clock period. The multiplication ratio is variable and is determined directly by the microcomputer. The frequency of the clock may be 5 MHZ, for example.

The reference clock signal is applied to a programmable frequency divider 50 which gives, at its output, a frequency divided by a number defined by a digital signal SEL-VAL given by the microcomputer. This signal SEL-VAL either directly represents the division ratio or represents a code identifying one among several possible predetermined ratios. In any case, it defines the control signal of the divider with the controllable division ratio.

The output of the divider is a signal whose period is the bit time. This signal is shaped and counted in a circuit for the preparation of synchronization signals 52 to provide synchronization signals whose period represents the desired bit time and whose counting represents the rank of the bits taken from a beginning of data transmission. The synchronization signals may be offset with respect to one another. For example, the signals that will be used for the write channel in the card may be slightly offset with respect to the signals that will be used for the read channel. These synchronization signals are used especially to pilot or control the parallel-series and series-parallel converters so that the conversion takes place in synchronism with the transmission of data from the card or to the card. The signals for the converters are not only signals whose period is equal to the bit time, but also signals counting the bit times up to twelve if the pieces of data transmitted between the card and the reader comprise twelve bits. It is the synchronization and counting circuit 52 that gives the various useful signals.

The card uses the clock of the reader and works with a protocol that sets the bit time at a certain multiple of the clock frequency. By default, a bit time is equal to 372 clock cycles, but faster protocols (with 31 cycles) are being made at present and it may even be hoped that ultra-fast (2 bit) protocols are being developed. The microcomputer will give a value SEL-VAL to impose a bit time on the reader corresponding to that of the card. The synchronization signal or signals prepared by the reader may furthermore be transmitted not only to the internal circuits of the reader, but also to the microcomputer on conductors reserved for this purpose in the communications port.

The synchronization signals are also given to other circuits of the reader, such as, for example, the automatic re-transmission request circuit 34. Indeed, this circuit must produce a series of bits representing the order of re-transmission, with the bit time corresponding to the protocol.

It will be noted that, to ensure the starting of the circuit, the protocol is imposed by default with a lengthy bit time of 372 clock periods so that the answer to reset sent with this bit time can be sampled before the microcomputer has detected the protocol of the card and has imposed, on the reader, the bit time that will be used in the following exchanges. The digital value SEL-VAL is stored in a volatile state register at the control input of the divider 50. An important point in the embodiment of the invention is the fact that certain read circuits (especially within the circuit 22 which prepares the control signals providing for the operation of the reader) may include random access memory registers. These are directly loaded by the microcomputer during the setting of the operation (or after the answer to the setting of the card). The signal SEL-VAL, in particular, is loaded into a register of this kind to be preserved during the operation of the exchanges up to reception of a following bit time change command sent by the microcomputer.

What is claimed is:

1. A chip card reader, for operating under control of a microcomputer of a type comprising an output bus, to provide for data exchanges between a chip card and the microcomputer, the chip card reader comprising:
    a data buffer memory enabling temporary storage of a data element read in the chip card pending reading by the microcomputer;
    a reference clock for generating a reference clock signal; and
    a digitally programmable frequency divider for receiving a digital control signal from the output bus of the microcomputer representing a desired frequency division ratio, said frequency divider further receiving the reference clock signal and generating a synchronization signal for data exchanges between the chip card and the chip card reader, the synchronization signal having a period corresponding to a desired bit time obtained by division of the reference clock signal according to the desired frequency division ratio from the microcomputer so that no microprocessor is used in the chip card reader.

2. A chip card reader according to claim 1, further comprising a circuit for preparing synchronization signals having a period representing the desired bit time and which upon counting represent a rank of bits starting from a beginning of data transmission.

3. A chip card reader according to claim 2, further comprising series-parallel and parallel-series conversion circuits; and wherein said circuit for preparing synchronization signals controls at least said series-parallel and parallel-series conversion circuits.

4. A chip card reader according to claim 3, further comprising a parity error detection circuit connected to said series-parallel conversion circuit.

5. A chip card reader according to claim 3, further comprising a parity computation circuit connected to said parallel-series conversion circuit.

6. A chip card reader according to claim 5, further comprising a convention management circuit connected to said parity computation circuit.

7. A chip card reader according to claim 3, further comprising means for requesting retransmission connected to said circuit for preparing synchronization signals.

8. A chip card reader according to claim 2, wherein said circuit for preparing synchronization signals also controls said data buffer memory.

9. A chip card reader according to claim 1, wherein said digitally programmable frequency divider is programmable to provide a division ratio in a range of about 2 to 372.

10. A chip card reader according to claim 1, wherein said digitally programmable frequency divider is programmable to provide at least desired frequency division ratios of 2, 31 and 372.

11. A chip card reader, for operating under control of a microcomputer to provide for data exchanges between a chip card and the microcomputer, the chip card reader comprising:
    a data buffer memory enabling temporary storage of a data element read in the chip card pending reading by the microcomputer; and
    a frequency divider for receiving a digital control signal from the microcomputer representing a desired frequency division ratio and for generating a synchronization signal for data exchanges between the chip card and the chip card reader, the synchronization signal having a period corresponding to a desired bit time obtained according to the desired frequency division ratio from the microcomputer so that no microprocessor is used in the chip card reader.

12. A chip card reader according to claim 11, further comprising a circuit for preparing synchronization signals having a period representing the desired bit time and which upon counting represent a rank of bits starting from a beginning of data transmission.

13. A chip card reader according to claim 12, further comprising series-parallel and parallel-series conversion circuits; and wherein said circuit for preparing synchronization signals controls at least said series-parallel and parallel-series conversion circuits.

14. A chip card reader according to claim 13, further comprising a parity error detection circuit connected to said series-parallel conversion circuit.

15. A chip card reader according to claim 13, further comprising a parity computation circuit connected to said parallel-series conversion circuit.

16. A chip card reader according to claim 15, further comprising a convention management circuit connected to said parity computation circuit.

17. A chip card reader according to claim 12, further comprising means for requesting retransmission connected to said circuit for preparing synchronization signals.

18. A chip card reader according to claim 12, wherein said circuit for preparing synchronization signals also controls said data buffer memory.

19. A chip card reader according to claim 11, wherein said digitally programmable frequency divider is programmable to provide a division ratio in a range of about 2 to 372.

20. A chip card reader according to claim 11, wherein said digitally programmable frequency divider is programmable to provide at least desired frequency division ratios of 2, 31 and 372.

21. A chip card reader, for operating under control of a microcomputer to provide for data exchanges between a chip card and the microcomputer, the chip card reader comprising:

a data buffer memory enabling temporary storage of a data element read in the chip card pending reading by the microcomputer;

a frequency divider for receiving a digital control signal from the microcomputer representing a desired frequency division ratio and for generating a synchronization signal for data exchanges between the chip card and the chip card reader, the synchronization signal having a period corresponding to a desired bit time obtained according to the desired frequency division ratio from the microcomputer so that no microprocessor is used in the chip card reader; and a circuit for preparing synchronization signals having a period representing the desired bit time and which upon counting represent a rank of bits starting from a beginning of data transmission.

22. A chip card reader according to claim 21, further comprising series-parallel and parallel-series conversion circuits; and wherein said circuit for preparing synchronization signals controls at least said series-parallel and parallel-series conversion circuits.

23. A chip card reader according to claim 22, further comprising a parity error detection circuit connected to said series-parallel conversion circuit.

24. A chip card reader according to claim 22, further comprising a parity computation circuit connected to said parallel-series conversion circuit.

25. A chip card reader according to claim 24, further comprising a convention management circuit connected to said parity computation circuit.

26. A chip card reader according to claim 21, further comprising means for requesting retransmission connected to said circuit for preparing synchronization signals.

27. A chip card reader according to claim 21, wherein said circuit for preparing synchronization signals also controls said data buffer memory.

28. A chip card reader according to claim 21, wherein said digitally programmable frequency divider is programmable to provide a division ratio in a range of about 2 to 372.

29. A chip card reader according to claim 21, wherein said digitally programmable frequency divider is programmable to provide at least desired frequency division ratios of 2, 31 and 372.

30. A method for reading a chip card using a chip card reader operating under control of a microcomputer to provide for data exchanges between the chip card and the microcomputer, the method comprising the steps of:

providing the card reader with a data buffer memory enabling temporary storage of a data element read in the chip card pending reading by the microcomputer; and receiving a digital control signal from the microcomputer representing a desired frequency division ratio for a frequency divider of the chip card reader and generating a synchronization signal for data exchanges between the chip card and the chip card reader, the synchronization signal having a period corresponding to a desired bit time obtained according to the desired frequency division ratio from the microcomputer so that no microprocessor is used in the chip card reader.

31. A method according to claim 30, further comprising the step of preparing synchronization signals having a period representing the desired bit time and which upon counting represent a rank of bits starting from a beginning of data transmission.

* * * * *